Nov. 15, 1966

C. W. EARP 3,286,262

AMPLITUDE MODULATION RADIO BEACON

Filed March 6, 1964

Inventor
CHARLES W. EARP

Nov. 15, 1966    C. W. EARP    3,286,262
AMPLITUDE MODULATION RADIO BEACON
Filed March 6, 1964    3 Sheets-Sheet 2
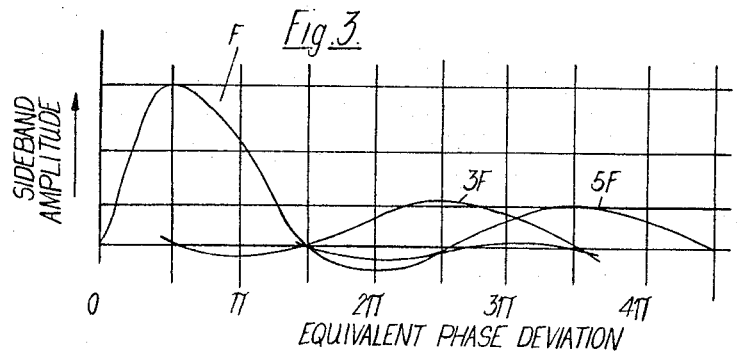
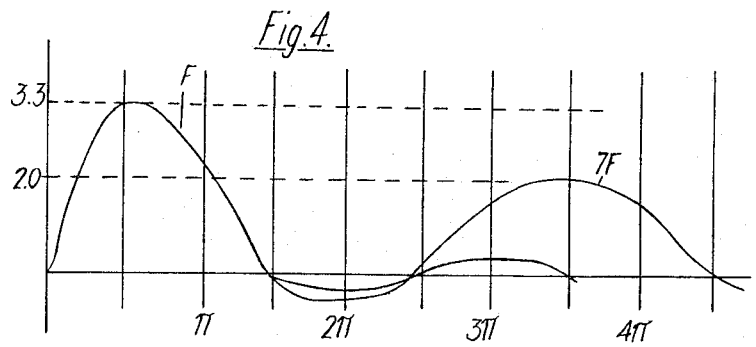
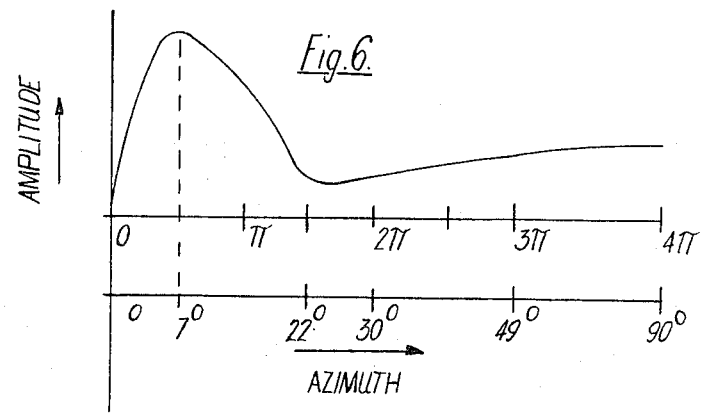
Inventor
CHARLES W. EARP
By
Attorney

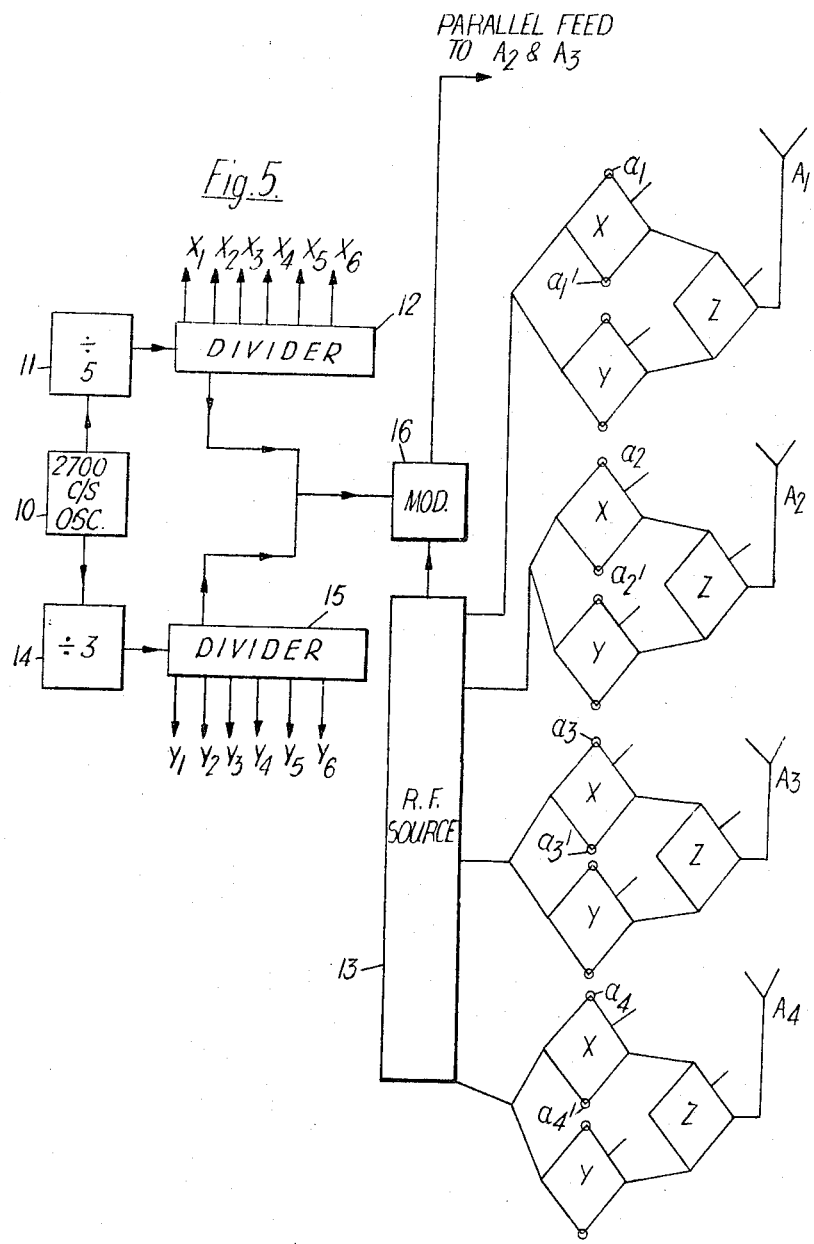

United States Patent Office 3,286,262
Patented Nov. 15, 1966

3,286,262
AMPLITUDE MODULATION RADIO BEACON
Charles William Earp, London, England, assignor to International Standard Electric Corporation, New York, N.Y., a corporation of Delaware
Filed Mar. 6, 1964, Ser. No. 350,040
Claims priority, application Great Britain, Mar. 13, 1963, 9,974/63
17 Claims. (Cl. 343—107)

This invention relates to radio approach beacons in which the output of a transmitter is coupled in turn to a number of aerials disposed on a line in order to simulate a radiating source in linear to-and-fro motion.

A craft equipped with a co-operating receiver can navigate with respect to such beacons by evaluating the deviation of a frequency modulation signal apparently transmitted by the beacon. The frequency modulation arises because the apparent movement of the simulated source results in a varying Doppler frequency shift.

It is often more desirable to navigate a craft according to a received amplitude modulation.

The invention in one aspect provides a radio beacon including means either to effect or to simulate the oscillatory movement with mutually opposite phases of a pair of radiating aerials, the movement or simulated movement being such that an amplitude modulated radiated field is produced by the two aerials.

According to another aspect of the invention, there is provided a radio beacon including means to simulate oppositely phased movements along a line of a pair of aerials energized with radio frequency energy in opposite phase to each other by cyclic successive coupling of spaced aerials to a transmitter.

In one preferred embodiment of the invention, the opposite oscillatory movements are not simple harmonic, but are linear symmetrical saw-tooth movements.

In another preferred embodiment, there are simulated by successive coupling four such pairs of sources in opposed saw-tooth oscillatory movements, the phases of the opposed movements being synchronized.

In all of the embodiments of the invention to be described there is also radiated continuously from one or more aerials a wave in quadrature with both of the waves of the pair or each pair of the apparently moving sources for the detection of the amplitude modulation in a cooperating receiver. This wave is not successively switched to different aerials.

Embodiments of the invention will now be described with reference to the accompanying drawings, in which:

FIG. 3 shows similarly the A.M. sideband amplitudes for two pairs of simulated sources in opposite linear symmetrical saw-tooth movements;

FIG. 4 shows the sideband amplitudes when four such pairs are simulated;

FIG. 5 shows diagrammatically an electronic switching arrangement for successive aerial coupling; and FIG. 6 shows the sideband amplitudes set up in one arrangement when two different kinds of source movement are simulated simultaneously.

Figure 1:
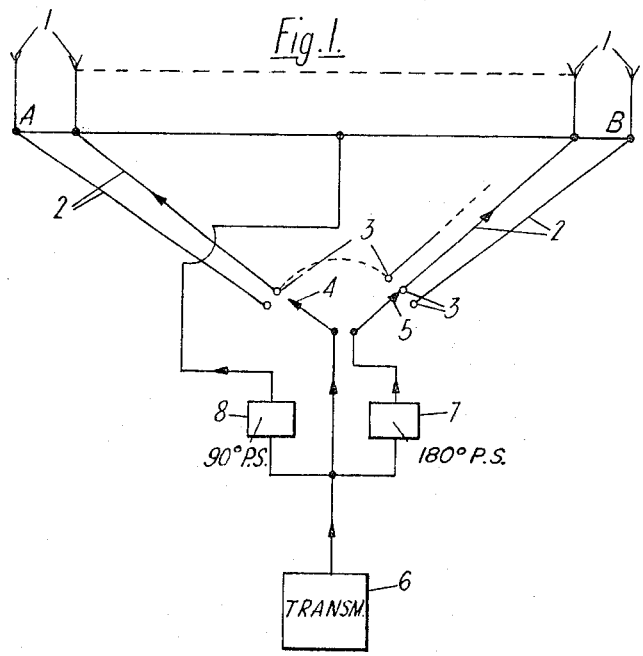
FIG. 1 shows diagrammatically a line of aerials and a transmitter effecting their successive energization.

Referring to FIG. 1, there are shown two aerials 1 at each end of a row of N equispaced similar aerials disposed on a line AB. Each of the N aerials 1 is coupled by a respective transmission line 2 to a respective fixed contact 3 of a switching device. The switching device has, in addition to the N fixed contacts 3, a pair of moving contacts 4 and 5 coupled to the output of a VHF transmitter 6. The contact 4 is directly coupled while the contact 5 is coupled to the transmitter output via a 180° phase shifter 7.

All the transmission lines 2 introduce equal or negligible phase shifts. The aerial spacing is slightly less than $\lambda/2$ at the frequency of the transmitter 6 so that all-round guidance may be obtained. If guidance were not required at an angle greater than $\theta$ from the perpendicular bisector of the array, the aerial spacing should not exceed $\lambda/2 \operatorname{cosec} \theta$.

The moving contacts 4 and 5 are driven by means not shown so as to sweep always in opposite directions over all the fixed contacts 3 cyclically from end to end.

This arrangement enables the simulation of a pair of sources radiating waves of equal amplitude, but oppositely phased and moving always in opposite directions to and fro along the line AB, one source therefore apparently moving towards B whenever the other moves towards A.

The output of the transmitter 6 is coupled also to a central one of the aerials 1 via a 90° phase shifter 8 so that from this central aerial is a fixed source of radiated waves in quadrature with those from the simulated moving sources.

The three radiated waves produce a radiation field around the line AB which is an amplitude modulation, there being many sidebands present, even though each moving source separately creates a frequency modulation field pattern due to the Doppler effect.

The nature of the A.M. field depends on the length of the line AB, and also of the law of motion of the simulated sources in describing the line AB. This law of motion will depend among other things on the spacing of the contacts 3 of the switching device.

In one embodiment of the invention, the spacing of the fixed contacts 3 is such that reciprocation of the moving contacts 4 and 5 provides a simple harmonic oscillatory motion of the two oppositely moving simulated sources.

The resulting field is a set of odd-order sidebands of the frequency of the energization cycle. At all azimuths, the even-order sidebands and carrier wave have cancelled, but all of the odd-order sidebands are present. Apart from very near-field effects, the field is a pure amplitude modulation, and one sideband is filtered in a co-operating receiver so that the equipped craft can navigate.

In another embodiment of the invention, fixed contacts 3 in FIG. 1 are equispaced and the moving contacts 4 and 5 move over them to and fro at constant velocity. Thus the simulated moving sources each describe the line AB at constant velocity before reversing in direction. In other words each source apparently describes a linear symmetrical saw-tooth movement.

The radiation field from this embodiment has the advantage over that just described that the odd-order amplitude modulation sidebands are separated in azimuth as is described more fully below with reference to FIG. 2, so that the problem of separating overlapping sidebands is less acute.

Figure 2:
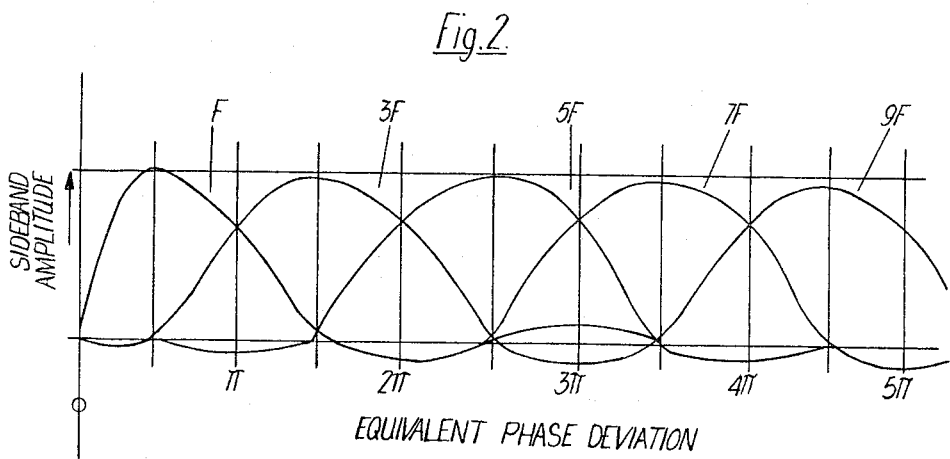
FIG. 2 is a graph showing the relation between the amplitude of various sidebands for varying azimuth directions from the line of FIG. 1 when the aerials are energized successively to simulate a pair of sources moving oppositely according to a linear symmetrical saw-tooth law cycle.

FIG. 2 shows the nature of the A.M. field set up around the energized aerials for apparent linear symmetrical saw-tooth motions. The abscissa is the equivalent phase deviation, due to the simulated movement, of waves from one source and is equal to $\pi.AB \sin \theta$, where $\theta$ is the angle made by the bearing line from the point in space observed with the perpendicular bisector of the line AB. Since the line AB is nearly $N\lambda/2$ long, an equivalent phase deviation of $\pi$ will correspond to an angle $\theta$ of about $\sin^{-1}(2/N)$. The maximum phase deviation equivalent will be observed from in line with the array and is equal to $\pi/\lambda.AB$.

The curve marked F is the magnitude of the sideband at the frequency F of the energization cycle, i.e. the frequency at which a simulated moving source describes A to B and back to A. The curves 3F, 5F, 7F and 9F are the magnitudes of the sidebands at these frequencies.

It will be observed that the various sidebands each maximize at a different equivalent phase deviation, for instance, the curve F has a maximum at $\pi/2$. At deviations other than $\pi/2$, $3\pi/2$, $5\pi/2$, etc., more than one sideband is present, thus the signal envelope is not a pure sinusoid.

The pattern shown in FIG. 2 is that on one side of the perpendicular bisector of AB only, on the other side the pattern is the same but the actual A.M. has the opposite phase.

On the horizontal perpendicular bisector, the A.M. magnitude is zero, and thus a receiver on this line will not detect any A.M. In order that this condition may be differentiated from a breakdown, an amplitude modulation may be applied to the wave which is radiated from a fixed point, the deviation of the receiver from this line will add to or subtract from this initially radiated A.M. according to the sense of the deviation.

In a further embodiment the switch shown in FIG. 1 has added to it a further pair of oppositely moving contacts (not shown) moving over the fixed contacts 3 with the same frequency F but differing in time phase from the movement of the contacts 4 and 5 by 60°.

The result is that there are simulated a second pair of oppositely moving radiating sources over the same track but delayed by 1/6F seconds from the movements of the first pair.

Due to these four simulated radiators, the F sideband will now be the resultant of two vectors inclined at 60°, while the 3F sideband will result from 180° spaced vectors.

Thus compared with FIG. 2, the F sideband is boosted by 1.73 and the 3F sideband is zero. This provides even better space isolation of the F sideband from other sidebands. The 9F sideband will also be zero. The 5F and higher sidebands may be removed, as will be described later, by having the line AB of the array so short that these higher sidebands have not a significant amplitude anywhere around the beacon.

In extension of the same principle, a further two pairs of oppositely moving antiphased sources simulated by introducing further moving contacts or further switching devices can be made to cause even more reinforcement of selected bands at the expense of others, and hence better use of available transmitter energy. If to the two 60° spaced pairs of oppositely moving sources mentioned above, there are added a further two pairs of 60° spaced pairs, such that there are four pairs each separated from the next one in time phase by 30°. This involves the simulation of eight separate moving sources, four radiating a carrier of the one phase, their time phases of to-and-fro movement being (say) 0°, 30°, 60° and 90°, and four more radiating a carrier of the opposite phase, time-phased in movement at 180°, 210°, 240° and 270° (i.e. moving in opposite to respective ones of the first four).

FIG. 3 shows the spectrum of the radiation field from this arrangement, which also boosts the F sideband while cancelling the 3F sideband. The 5F and 7F sidebands are much weaker than the F sideband while that at 9F is also zero.

In yet another arrangement there are also four separate pairs of oppositely moving simulated sources, this time spaced irregularly in time-phase of movement at 0°, 36°, 60° and 96°. The movements are again linear symmetrical saw-tooth in form and zero output this time occurs at 3F, 5F and 9F as shown in FIG. 4. Thus little transmitter power is wasted in setting up radiation fields at these frequencies, while near to the course-line the F sideband is boosted to 3.3 times the voltage which would be radiated by a single pair of oppositely moving sources excited in opposite phase.

The above arrangements have all been described with reference to FIG. 1 which shows a mechanical switching arrangement. It is immaterial what mode of switching is used so long as the pair or pairs of oppositely moving sources as described are simulated sufficiently well for a distant receiver to receive signals which do apparently come from actual moving sources. In these arrangements the aerials should not be more than $\lambda/2$ apart.

Since the "carrier" aerial which is fed in quadrature with the switched waves is centrally disposed, and the sources of each pair are oppositely moving, they are always symmetrically disposed with reference to the carrier aerial, and so the latter will only suffer equal and opposite excitations due to any aerial interaction effect. This quadrature wave may if desired be sent from a separate central aerial.

When an aerial is scheduled to be excited by waves of opposite phases at once, it is better not to excite it at all.

A more detailed description of an approach beacon having equipment for feeding four aerials in a line to simulate two pairs of oppositely moving sources with a 60° time phase difference between the simulated movements will now be described with reference to FIG. 5.

Four aerials $A_1$, $A_2$, $A_3$ and $A_4$, spaced just less than $\lambda/2$ to a line, have means to energize them in turn at equal intervals by connection to two antiphased outputs of a transmitter in repeated cycles according to the following schedule:

| Coupling step | 1 | 2 | 3 | 4 | 5 | 6 |
| --- | --- | --- | --- | --- | --- | --- |
| Aerials energized in one phase | $A_1$ and $A_2$ | $A_2$ and $A_3$ | $A_3$ and $A_4$ | $A_4$ and $A_3$ | $A_3$ and $A_2$ | $A_2$ and $A_1$ |
| Aerials energized in opposite phase | $A_4$ and $A_3$ | $A_3$ and $A_2$ | $A_2$ and $A_1$ | $A_1$ and $A_2$ | $A_2$ and $A_3$ | $A_3$ and $A_4$ |

At each step two aerials are connected to each of the oppositely phased transmitter outputs, so that two pairs of oppositely moving sources are simulated. One pair of sources moves one step of 60° behind the other, so that the resulting radiation field resembles the spectrum shown in FIG. 2 with the 3F sideband removed, and the F sideband boosted by 2 sin 60°.

There is one difference, however, in that the maximum equivalent phase deviation possible is $3\pi/2$ because the length of the aerial array is only approximately $3\pi/2$, so that the 5F and 7F sidebands are negligible.

The embodiment shown in FIG. 5 will only radiate at a significant amplitude the first pair of sidebands over the whole range of azimuth.

Referring in more detail to FIG. 5, the apparatus includes 2700 c./s. oscillator 10 feeding a ×5 divider 11 which feeds a ring-of-six divider 12. The latter has six separate outputs $X_1$, $X_2$, $X_3$, $X_4$, $X_5$ and $X_6$ which each carry pulses in turn at ninety per second in response to the 540 cycles/sec. input.

The pulses are used to ungate a transmitter 13 by means of shunt switching diodes in four bridge circuits X so that the respective aerials $A_1$, $A_2$, $A_3$ and $A_4$ are fed only when demanded by the above-mentioned schedule.

The bridge circuits X comprise three lines of $\lambda/4$ path length and one $3\lambda/4$ line connected end to end in a square. At two opposite corners the connections are via shunt switching diodes $\alpha, \alpha'$. The other two connected corners of each bridge circuit X are coupled to the aerial A and to the transmitter output. A pulse $x_1, x_2 \ldots$ or $x_6$ applied to either diode $a$, $a'$ makes the diode conduct, and the phase of the thus ungated transmitter signal reaching the aerial A is in one direction or in that direction directly opposite according to whether diode $a$ or $a'$ is triggered, due to the presence of one $3\lambda/4$ line in the bridge X.

For instance, referring to the first step of the above schedule, the pulse $x_1$ is applied to the diodes $a_1$, $a_2$, $a'_4$ and $a'_3$ as the first coupling step, and the next but one phase $x_3$ to diodes $a_3$, $a_4$, $a'_1$ and $a'_2$. It will be seen that the pulses $x_2$ and $x_5$ are scheduled to switch both diodes of two bridges, which would short-circuit the transmitter output. To avoid this, the transmitter is either immobilized or made to feed a matched load. This does not disturb the radiation field since the feeding of an aerial A is two opposite phases in equivalent to no feed at all.

Thus one pair of simulated sources lags the other by 60° (one coupling step at six to the cycle) and the field shown in FIG. 3 is set up, F being equal to 90 c./s.

In this embodiment the two centre aerials $A_2$ and $A_3$ are also excited with the transmitter output in quadrature with the four simulated sources and this continuous energization carries an amplitude modulation derived from the oscillator 10 at 90 c./s., so that this modulation adds to that produced by the simulated source movement on one side of the horizontal perpendicular through the array, and substracts from it on the other side.

Simultaneously with the two pairs of simulated sources oppositely moving at 90 c./s. to-and-fro on the aerial line, there are simulated by means of the same RF transmitter two more pairs of sources moving in an exactly similar manner at 150 c./s., so that there is superimposed another similar radiation field, this time F being 150 c./s.

An amplitude modulation also derived from the 2700 c./s. oscillator 10 at 150 c./s. is superimposed on that at 90 c./s. on the carrier continuously fed to the central aerials $A_2$ and $A_3$, but is phased so that this 150 c./s. modulation adds to that due to the moving sources on the other side of the perpendicular through the array and subtracts on the first side; i.e. contrary to the 90 c./s. modulation.

Thus a craft equipped with a co-operating receiver will detect equal signals when on the perpendicular bisector which is the ordinate axis in FIG. 2. The 90 c./s. A.M. will predominate on one side of the bisector and on the other side the 150 c./s. A.M. will predominate. Hence the craft can tell the sense of its displacement from the horizontal perpendicular bisector through the aerial array.

Returning to the equipment shown in FIG. 5, the signal from the oscillator 10 is divided by three in a divider 14 and the resulting 900 c./s. signal further divided by six in a second ring-of-six divider 15 which, like divider 12, provides output pulses on six separate leads $Y_1 \ldots Y_6$ in turn this time at 150 c./s. This also provides a 150 c./s. output for the modulation of the quadrature output of transmitter 13 in a modulator 16, which also receives a 90 c./s. signal from the divider 12. The pulses $y_1 \ldots y_6$ are fed to switching diodes on the Y bridges to feed the aerials $A_1$, $A_2$, $A_3$, $A_4$ as did the pulses from $x_1 \ldots x_6$.

In order that each aerial may be fed via a bridge X or a bridge Y or by both at the same time without detriment to the transmitter, each of the bridges X and Y feed into opposite corners of a further bridge Z which also has three $\lambda/4$ lines and a $3\lambda/4$ line. The aerial is coupled to a third corner of the bridge Z. By this means negligible coupling exists between a bridge X and a bridge Y.

It will be understood that this electronic method of successive aerial switching may be replaced by any other method so long as the schedule illustrated above is carried out.

The number of aerials fed continuously with the wave in phase quadrature with the commutated waves is immaterial except that the feeding of more than one results in a directive effect.

The method of indicating the sense of the deviation of a craft from the line of symmetry by using two commutated frequencies is not essential to the invention. The extra 150 c./s. apparatus designated Y in the diagram may be omitted if sense of deviation is not required, or may be replaced by other sense indicating means.

Another example of the invention will now be described in which there are twelve aerials $A_1 \ldots A_{12}$ positioned equispaced on a line of total length $4\lambda$.

In this example, the linear symmetrical saw-tooth switching cycle is maintained, but the commutation is performed such that four pairs of oppositely moving antiphased carrier sources are simulated. The general method of switching is similar to that illustrated for the last embodiment, except that the end aerials $A_1$ and $A_{12}$ are energized always for two coupling steps to avoid having to energize any aerial twice during a single time element via the same X bridge.

The four pairs of oppositely moving sources are spaced in movement at 30° intervals in order to produce the radiation field spectrum shown in FIG. 3. Since the end aerials are coupled each time for two consecutive coupling steps, there are twenty-four steps and so a 30° interval between sources corresponds to two steps.

The coupling cycle to one phase of the transmitter will thus be in successive coupling steps:

$A_1 A_2 A_3 A_4 \ldots A_{11} A_{12} A_{12} A_{11} \ldots A_2 A_1 A_1 A_2$, etc.
$A_3 A_4 A_5 A_6 \ldots A_{12} A_{11} A_{10} A_9 \ldots A_1 A_2 A_3 A_4$
$A_5 A_6 A_7 \ldots A_{10} A_9 A_8 \ldots A_3 A_4 A_5 A_6$
$A_7 A_8 \ldots A_8 A_7 \ldots A_7 A_8$ and to the other phase the corresponding steps will be:

$A_{12} A_{11} \ldots A_2 A_1 A_1 A_2 \ldots A_{11} A_{12} A_{12} A_{11}$
$A_{10} A_9 \ldots A_3 A_4 \ldots A_{11} A_{10} A_9$
$A_8 A_7 \ldots A_5 A_6 \ldots A_9 A_8 A_7$
$A_6 A_5 \ldots A_1 A_1 \ldots A_7 A_8 \ldots A_7 A_6 A_5$ At any coupling step eight aerials are coupled via an "X" bridge to simulate the 90 c./s. movements, and eight are coupled via a "Y" bridge to simulate identical movements at 150 c./s.

The apparatus in this embodiment is analogous to that shown in FIG. 5, the main difference being that since more pulses are required in the X and Y coupling cycles, the oscillator 10 is tuned to 10,800 c./s. which is divided as before by 5 and 3 for the X and Y circuits, and "ring-of-24" dividers are used instead of "ring-of-six" dividers.

Peak output at the frequency F corresponds to $\sin^{-1} 1/8$ or 7° from the perpendicular bisector "course" line.

The signal in quadrature with the waves from the simulated sources is again modulated at 150 c./s. and 90 c./s. so that the sense of deviation from the "course" line can be determined, and is again coupled continuously to the two centre aerials ($A_6$ and $A_7$).

The radiation field is generally as shown in FIG. 3 for both $F=90$ and $F=150$ c./s. The amplitude modulation due to the non-commutated signal is added or subtracted to that shown according to which side of the perpendicular bisector of the array (i.e., the ordinate axis in FIG. 3) the co-operating receiver is located and in opposite senses according to whether the $F=90$ c./s. or 150 c./s. modulations are being considered.

One further embodiment and a variation thereof will now be described which differs from the last embodiment only in that an additional coupling sequence is added to all the others so that a sideband at frequency F appears to a small extent for all azimuth bearings around the beacon.

Referring to FIG. 3 which showed the nature of the radiation field set up by the radiations of the last embodiment, it will be seen that the amplitude at the first sideband frequency F is insignificant for equivalent phase deviations above $3\pi/2$, i.e., ±22° azimuth. In this embodiment another radiation field is superimposed on that shown in FIG. 3 so that in the combined field, the total amplitude modulation sideband at frequency F does not equal zero anywhere, although its amplitude is smaller beyond $3\pi/2$.

Additional equipment is provided to energize the middle six aerials $A_4 \ldots A_9$ from the transmitter at a cyclic frequency of 30 cycles per second in order to simulate three further pairs of oppositely moving antiphased sources. The three further pairs are phased at equal (120°) intervals so that the fundamental amplitude modulation sideband at 30 c./s. in the resulting field cancels to zero, as do the fifth and seventh order sidebands. The third order A.M. sideband at 90 c./s. is boosted to three times the normal value and this lobe extends from $\pi/2$ to $5\pi/2$ equivalent phase deviation.

Since only half the aerial array is now being commutated at 30 c./s., the above deviations correspond to from $\pi$ to $5\pi$ on the field shown in FIG. 3.

FIG. 6 shows the total field at 90 c./s. now obtained by the superimposition of the two radiation fields. In this figure, 90 c./s. amplitude is plotted against both equivalent phase deviation for a single source and against azimuth calculated from the $4\lambda$ length of the array.

This is the only embodiment described herein in which a third order sideband has been utilized, but those skilled in the art can clearly extend the principles of simulated oppositely moving antiphased sources by progressive aerial coupling to utilize the higher order sidebands.

The three twin commutation cycles at 30 c./s. may be performed instead of or as well as at 50 c./s. to reinforce the 150 c./s. field corresponding to FIG. 3 in the same way.

There aerial couplings are actually preformed using a ring-of-12 divider and another set of bridges with switching diodes as described previously in twevlve steps as follows:

| | $A_4$ | $A_5$ | $A_6$ | $A_7$ | $A_8$ | $A_9$ | $A_9$ | $A_8$ | $A_7$ | $A_6$ | $A_5$ | $A_4$ | |
|---|---|---|---|---|---|---|---|---|---|---|---|---|---|
| One carrier phase | $A_8$ | $A_9$ | $A_9$ | $A_8$ | $A_7$ | $A_6$ | $A_6$ | $A_5$ | $A_4$ | $A_4$ | $A_5$ | $A_6$ | $A_7$ | Repeated at 30 c./s. |
| | $A_7$ | $A_6$ | $A_5$ | $A_4$ | $A_4$ | $A_5$ | $A_6$ | $A_7$ | $A_8$ | $A_9$ | $A_9$ | $A_8$ | |
| | $A_9$ | $A_8$ | $A_7$ | $A_6$ | $A_5$ | $A_4$ | $A_4$ | $A_5$ | $A_6$ | $A_7$ | $A_8$ | $A_9$ | |
| Opposite carrier phase | $A_5$ | $A_4$ | $A_4$ | $A_5$ | $A_6$ | $A_7$ | $A_8$ | $A_9$ | $A_9$ | $A_8$ | $A_7$ | $A_6$ | Repeated at 30 c./s. |
| | $A_6$ | $A_7$ | $A_8$ | $A_9$ | $A_9$ | $A_8$ | $A_7$ | $A_6$ | $A_5$ | $A_4$ | $A_4$ | $A_5$ | |

It will be seen that each of the cycles involves coupling the end aerials $A_4$ and $A_9$ twice.

One more embodiment will now be described which produces exactly the same radiation field as the last embodiment, i.e. that shown in FIG. 6 at 90 c./s. This embodiment differs from the last only in that the 12-step 30 c./s. coupling cycle for the middle aerials $A_4$ to $A_9$ is simplified to one of 90 c./s. having only four steps, viz:

| | $A_4$ | $A_5$ | $A_5$ | $A_4$ | |
|---|---|---|---|---|---|
| One carrier phase | $A_7$ | $A_6$ | $A_6$ | $A_7$ | Repeated at 90 c./s. |
| | $A_8$ | $A_9$ | $A_9$ | $A_8$ | |
| | $A_5$ | $A_4$ | $A_4$ | $A_5$ | |
| Opposite carrier phase | $A_6$ | $A_7$ | $A_7$ | $A_6$ | Repeated at 90 c./s. |
| | $A_9$ | $A_8$ | $A_8$ | $A_9$ | |

This simplification can be made because, as will be seen by inspection of the above 30 c./s. sequences for the last embodiment, cyclic recurrence actually occurs at 90 c./s.

Except for the first embodiment, all of the others involve linear symmetrical saw-tooth aerial coupling, which has the advantages over simple harmonic coupling that the aerials are coupled at equal intervals and, that the sidebands separate themselves considerably in azimuth around the beacon. This latter fact is very important in practice.

All of the embodiments require the co-operating receivers to be equipped only with amplitude modulation detection equipment, and the drawback of more complicated switching systems in some of the embodiments is compensated by having more of the transmitter power concentrated in low order sideband.

Longer aerial arrays give a wider base for the transmission, and hence a more interference-free field, but may result in more sidebands being present.

One advantage of the systems described herein is that for an aerial array of given length, the sharpness of the course defined by the beacon is twice that of I.L.S. beacons now in use. Site errors are probably reduced by a similar factor.

Another advantage is that of compatibility with I.L.S. approach beacons approved by I.C.A.O.

As stated previously, to an observer situated at an angle $\theta$ from the perpendicular through the array, the desired movements will not appear to be correctly simulated if the aerial spacing exceeds $\lambda \cosec \theta/2$. Thus if the spacing L exceds $\lambda/2$, the beacon cannot be relied on for angles greater than $\sin^{-1}(\lambda/2L)$.

It is to be understood that the foregoing description of specific examples of this invention is not to be considered as a limitation of its scope.

What I claim is:

1. A radio beacon for producing an amplitude modulated field, comprising an array of spaced aerials, a transmitter having first and second outputs of opposite phase, means for coupling said first output of said transmitter successively and cyclically to each of said aerials in said array, and means for coupling said second output of said transmitter successively and cyclically to each of said aerials in said array.

2. A radio beacon as in claim 1, in which said means for successively and cylically coupling said outputs of said transmitter to said array of aerials produces simultation of a pair of sources moving in opposite directions.

3. A radio beacon as claimed in claim 2 further including an aerial within said array, and means to energize said aerial with radio frequency energy in quadrature phase relationship with the radio frequency energy energizing said simulated pair of aerials.

4. A radio beacon as claimed in claim 3 wherein said array of aerials is a horizontal linear array and said aerial energized with the quadrature radio frequency energy is at the mid-point of said linear array.

5. A radio beacon as claimed in claim 4 wherein the cyclic successive coupling of the aerials of the array to the transmitter is such that simple harmonic motion of the oppositely moving sources is simulated.

6. A radio beacon as claimed in claim 4 wherein a linear saw-tooth movement of the sources is simulated.

7. A radio beacon as claimed in claim 6 wherein oppositely phased movements of a second pair of aerials is simulated, the simulated oscillatory movements of the first and second pairs of aerials differing in phase.

8. A radio beacon as claimed in claim 7 wherein the oscillatory movements of the pairs of radiating sources differ in phase by 60 degrees.

9. A radio beacon as claimed in claim 8 wherein oppositely phased movements of a third pair and a fourth pair of aerials along the line is simulated, the phase difference between the simulated oscillatory movements of the pairs of aerials being 30 degrees.

10. A radio beacon as claimed in claim 7 wherein the phase differences between the simulated oscillatory movements of the pairs of aerials are 0, 36, 60 and 96 degrees, respectively.

11. A radio beacon as claimed in claim 4 wherein the radio frequency energy energizing the aerial at the mid-point of the linear array is amplitude modulated.

12. A radio beacon as claimed in claim 11 wherein the cyclic successive coupling of the spaced aerials to the transmitter is at a first frequency and at a second frequency, and the radio frequency energy energizing the aerial at the mid-point of the linear array is amplitude modulated by signals at the first and second frequencies, the phasing of the amplitude modulations being such that on one side of the horizontal perpendicular bisector of the linear array the amplitude modulations of the combined radiated fields at the first and second frequencies of the array tend to add and to subtract, respectively, while on the other side of the said bisector the amplitude modulations at the first and second frequencies tend to subtract and add, respectively.

13. A radio beacon as claimed in claim 4 wherein each of the end aerials of said horizontal linear array is coupled to the transmitter for two consecutive coupling steps.

14. A radio beacon as claimed in claim 13 wherein twelve aerials are equally spaced on a straight line of length $4\lambda$ at the transmitter frequency and the oscillatory movements of four pairs of aerials are simulated, and the phase difference between the simulated oscillatory movements of the pairs of aerials being 30 degrees.

15. A radio beacon as claimed in claim 4 including means to simulate by successive coupling of some of the spaced aerials to the transmitter oppositely phased oscillatory movements along the straight line of a second pair of aerials energized with radio frequency energy in opposite phase to each other, the frequency of the oscillatory movements of the second pair of aerials being a sub-harmonic of the frequency of the oscillatory movement of the first pair of aerials.

16. A radio beacon as claimed in claim 1 wherein the spaced aerials are each coupled to the transmitter by means of two switching diodes each at opposite corners of a bridge circuit having three arms of electrical length $\lambda/4$ at the transmitter frequency and a fourth arm of electrical length $3\lambda/4$.

17. A radio beacon as claimed in claim 16 wherein the spaced aerials are each coupled to the transmitter by means of two further switching diodes each at opposite corners of a further bridge circuit having three arms of electrical length $\lambda/4$ at the transmitter frequency and a fourth arm of electrical length $3\lambda/4$.

References Cited by the Examiner

UNITED STATES PATENTS

| | | | |
|---|---|---|---|
| 2,411,518 | 11/1946 | Busignies | 343—106 |
| 2,521,702 | 9/1950 | Earp et al. | 343—108 |
| 3,094,697 | 6/1963 | Kramar et al. | 343—106 |
| 3,115,634 | 12/1963 | Karpeles | 343—108 |
| 3,130,407 | 4/1964 | Kramar | 343—106 |

CHESTER L. JUSTUS, *Primary Examiner.*

H. C. WAMSLEY, *Assistant Examiner.*